US012622338B2

(12) United States Patent
Hofmann et al.

(10) Patent No.: US 12,622,338 B2
(45) Date of Patent: May 12, 2026

(54) GROUND FOLLOWING HARROW

(71) Applicant: Schulte Industries Ltd., Saskatoon (CA)

(72) Inventors: Todd Hofmann, Saskatoon (CA); Miit Nimish, Saskatoon (CA); Bruno Jacobo, Saskatoon (CA)

(73) Assignee: Schulte Industries Ltd., Saskatoon (CA)

( * ) Notice: Subject to any disclaimer, the term of this patent is extended or adjusted under 35 U.S.C. 154(b) by 511 days.

(21) Appl. No.: 18/118,823

(22) Filed: Mar. 8, 2023

(65) Prior Publication Data

US 2023/0284545 A1    Sep. 14, 2023

(30) Foreign Application Priority Data

Mar. 8, 2022    (CA) ................................ CA 3151513

(51) Int. Cl.
A01B 63/32          (2006.01)
A01B 19/04          (2006.01)
A01B 19/10          (2006.01)

(52) U.S. Cl.
CPC .............. A01B 63/32 (2013.01); A01B 19/04 (2013.01); A01B 19/10 (2013.01)

(58) Field of Classification Search
CPC ..... A01B 63/32; A01B 23/043; A01B 73/044; A01B 19/04; A01B 19/08; A01B 23/02; A01B 73/02; A01B 63/24
See application file for complete search history.

(56) References Cited

U.S. PATENT DOCUMENTS

| | | | | | |
|---|---|---|---|---|---|
| 1,117,328 | A | * | 11/1914 | Clauson ................. | A01B 63/32 |
| | | | | | 172/470 |
| 2,963,098 | A | * | 12/1960 | Kesselring ............. | A01B 19/00 |
| | | | | | 172/488 |
| 3,173,497 | A | * | 3/1965 | French ................... | A01B 73/02 |
| | | | | | 172/456 |
| 4,396,069 | A | * | 8/1983 | Ferber ................... | A01B 63/32 |
| | | | | | D15/27 |
| 5,806,606 | A | * | 9/1998 | Robinson ............... | A01B 63/32 |
| | | | | | 172/198 |
| 8,657,026 | B2 | * | 2/2014 | Friesen ................. | A01B 63/32 |
| | | | | | 172/452 |

(Continued)

*Primary Examiner* — Christopher J Sebesta
*Assistant Examiner* — Blake E Scoville
(74) *Attorney, Agent, or Firm* — Dickinson Wright PLLC; Andrew D. Dorisio

(57)          ABSTRACT

A harrow apparatus comprising an implement frame and a harrow section attached to a mounting assembly extending rearward from the implement frame such that the harrow section engages the ground surface. The mounting assembly is movable upward and downward to move the harrow section down and up. The mounting assembly comprises a beam extending rearward above the harrow frame, and front and rear arms pivotally attached at upper ends thereof to corresponding front and rear beam pivot axes located on the beam. The front arm slopes downward and rearward to a lower end thereof that is pivotally attached to the harrow frame at a front frame pivot axis, and the rear arm slopes downward and forward to a lower end thereof that is pivotally attached to the harrow frame at a rear frame pivot axis located rearward of the front frame pivot axis.

19 Claims, 14 Drawing Sheets

(56)     References Cited

U.S. PATENT DOCUMENTS

|  |  |  |  |  |
|---|---|---|---|---|
| 9,247,687 | B2 * | 2/2016 | Gray | A01B 29/048 |
| 9,363,938 | B1 * | 6/2016 | Slagel | A01B 63/32 |
| 10,194,574 | B2 | 2/2019 | Knobloch |  |
| 10,299,421 | B2 * | 5/2019 | Lung | A01B 19/10 |
| 10,602,653 | B2 | 3/2020 | Henry |  |
| 2007/0284125 | A1 * | 12/2007 | Payne | A01B 71/02 |
|  |  |  |  | 172/799.5 |
| 2012/0073844 | A1 * | 3/2012 | Friesen | A01B 63/32 |
|  |  |  |  | 172/452 |
| 2016/0073571 | A1 * | 3/2016 | Hurd | A01B 35/16 |
|  |  |  |  | 172/488 |
| 2016/0073572 | A1 * | 3/2016 | Evans | A01B 49/027 |
|  |  |  |  | 172/1 |
| 2018/0103575 | A1 * | 4/2018 | Gerber | A01B 19/04 |
| 2018/0116095 | A1 * | 5/2018 | Knobloch | A01B 23/043 |
| 2022/0295690 | A1 * | 9/2022 | Thompson | A01B 63/22 |

* cited by examiner

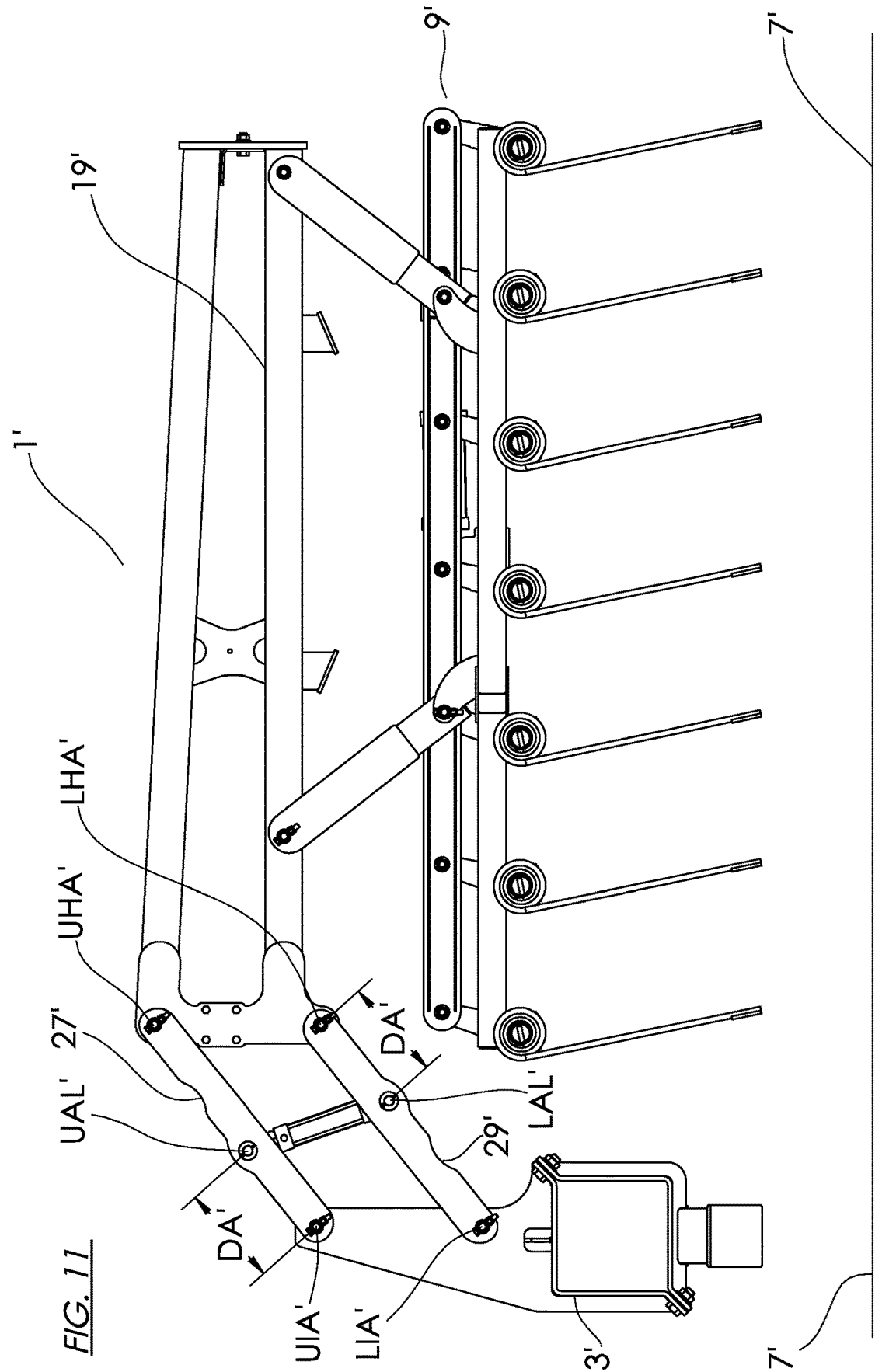
_FIG. 11_

GROUND FOLLOWING HARROW

This application claims priority to Canadian Patent Application No. 3,151,513 filed on Mar. 8, 2023, the disclosure of which is incorporated herein by reference.

This disclosure relates to the field of agricultural implements and in particular a harrow with a variable down force for following changes in the ground surface.

BACKGROUND

Harrows are typically mounted on quite wide implement frames as the harrows are relatively light to pull. The implement frame is typically a rectangular or cylindrical beam mounted on wheels with the harrow sections extending rearward from the implement frame. The implement frame can rotate to raise the harrows from an operating position to a transport position, or in some cases the mounting assembly for each harrow section is operative to raise the harrow section to a transport position. Outer portions of the implement frame are then typically configured to move rearward to place the implement in the transport position for movement along roadways and the like.

It is also known to mount harrow sections at the rear end of an air seeder or like ground working implement to pack and smooth the soil.

The harrow sections are attached to the implement frame with each harrow section mounted independently to the frame by a variety of mounting assemblies which allow the harrow section to follow the ground independent of adjacent harrow section, and provide various other features.

U.S. Pat. No. 8,657,026 to Friesen discloses a mounting assembly that can adjust the tine angle of the harrows. U.S. Pat. No. 10,194,574 to Knobloch et al. discloses an harrow where the tine angle is adjusted based on the percentage of plant residue at the harrows' present geographic location.

U.S. Pat. No. 10,299,421 to Lung et al. and 10,602,653 to Henry discloses mounting assemblies which put an upward or downward force on the barrows.

SUMMARY OF THE INVENTION

The present disclosure provides a harrow apparatus that overcomes problems in the prior art.

In a first embodiment the present disclosure provides a harrow apparatus comprising an implement frame mounted on wheels for travel along a ground surface in an operating travel direction. A harrow section comprises a plurality of rows of tines, the rows of tines spaced rearward from a front row of tines to a rear row of tines, and oriented substantially perpendicular to the operating travel direction, and the tines are attached to a harrow frame and extend downward substantially an equal distance from the harrow frame. The harrow section is attached to a mounting assembly extending rearward from the implement frame such that the harrow section engages the ground surface when in an operating position, and the mounting assembly is selectively movable upward and downward with respect to the implement frame to move the harrow section down into the operating position and up out of the operating position. The mounting assembly comprises a beam extending rearward above the harrow frame, and the mounting assembly comprises front and rear arms pivotally attached at upper ends thereof to corresponding front and rear beam pivot axes located on the beam. The front arm slopes downward and rearward to a lower end thereof that is pivotally attached to the harrow frame at a front frame pivot axis, and the rear arm slopes downward and forward to a lower end thereof that is pivotally attached to the harrow frame at a rear frame pivot axis located rearward of the front frame pivot axis.

In a second embodiment the present disclosure provides a harrow apparatus comprising an implement frame mounted on wheel for travel along a ground surface in an operating travel direction, and a harrow section comprising a plurality of rows of tines, the rows of tines spaced rearward from a front row of tines to a rear row of tines, and oriented substantially perpendicular to the operating travel direction. The tines are attached to a harrow frame and extend downward substantially an equal distance from the harrow frame. The harrow section is attached to a mounting assembly comprising a beam extending rearward from the implement frame such that the harrow section engages the ground surface when in an operating position. The mounting assembly comprises a parallel linkage comprising upper and lower links pivotally attached to the implement frame at front ends thereof about corresponding upper and lower implement pivot axes, and pivotally attached to the beam at rear ends thereof about corresponding upper and lower harrow pivot axes. The mounting assembly comprises an extendable actuator pivotally attached to the upper link at an upper actuator location, and pivotally attached to the lower link at a lower actuator location that is offset from the upper location toward the front or to the rear of the parallel linkage.

In a third embodiment the present disclosure provides a method of mounting a harrow section to an implement frame operative to move along a ground surface in an operating travel direction. The method comprises providing a harrow section comprising a plurality of rows of tines, the rows of tines spaced rearward from a front row of tines to a rear row of tines, and oriented substantially perpendicular to the operating travel direction; wherein the tines are attached to a harrow frame and extend downward substantially an equal distance from the harrow frame; attaching a beam extending rearward from the implement frame and operative to move upward and downward with respect to the implement frame; attaching the harrow section under the beam by pivotally attaching front and rear arms at upper ends thereof to corresponding front and rear beam pivot axes located on the beam, and attaching the front and rear arms at lower ends thereof to corresponding front and rear frame pivot axes located on the harrow frame; configuring the front and rear arms such that the front arm slopes downward and rearward to the lower end thereof and the rear arm slopes downward and forward to the lower end thereof.

The present disclosure provides a harrow section with improved ground following capabilities and where the force of the harrow section with respect to the ground surface can be varied.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 11 is a side view of the embodiment of FIG. 9 when the harrow section is in the highest position with respect to the implement frame;

DETAILED DESCRIPTION OF THE ILLUSTRATED EMBODIMENTS

Figure 1:
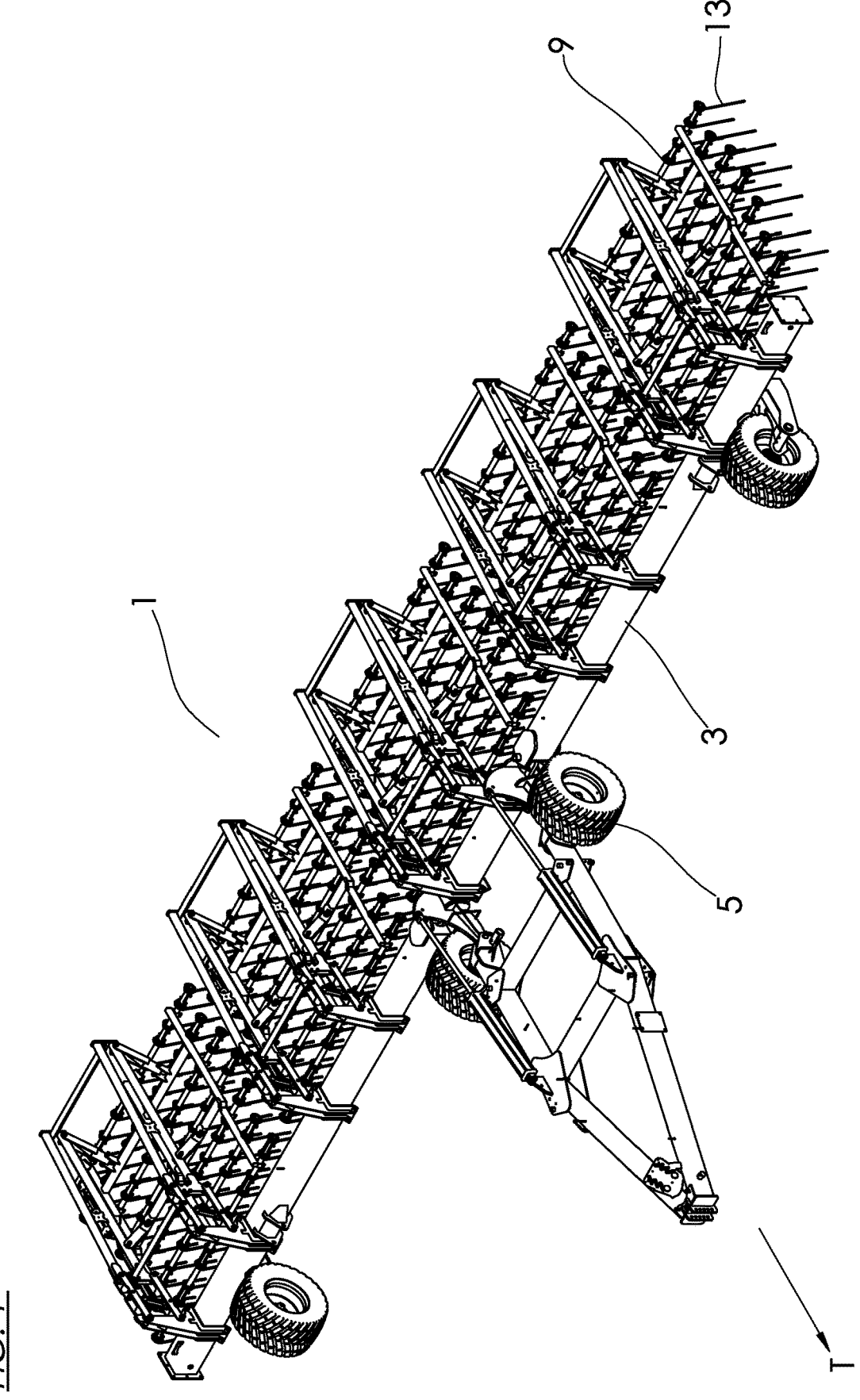
FIG. 1 is a schematic perspective view of an embodiment of the apparatus of the present disclosure.

FIGS. 1-8 illustrate an embodiment of a harrow apparatus 1 of the present disclosure. The apparatus 1 comprises an implement frame 3 mounted on wheels 5 for travel along a ground surface 7 in an operating travel direction T. A harrow section 9 comprises a plurality of rows 11 of tines 13, and the rows of tines 11 are spaced rearward from a front row of tines 11F to a rear row of tines 11R, and oriented substantially perpendicular to the operating travel direction T.

Figure 2:
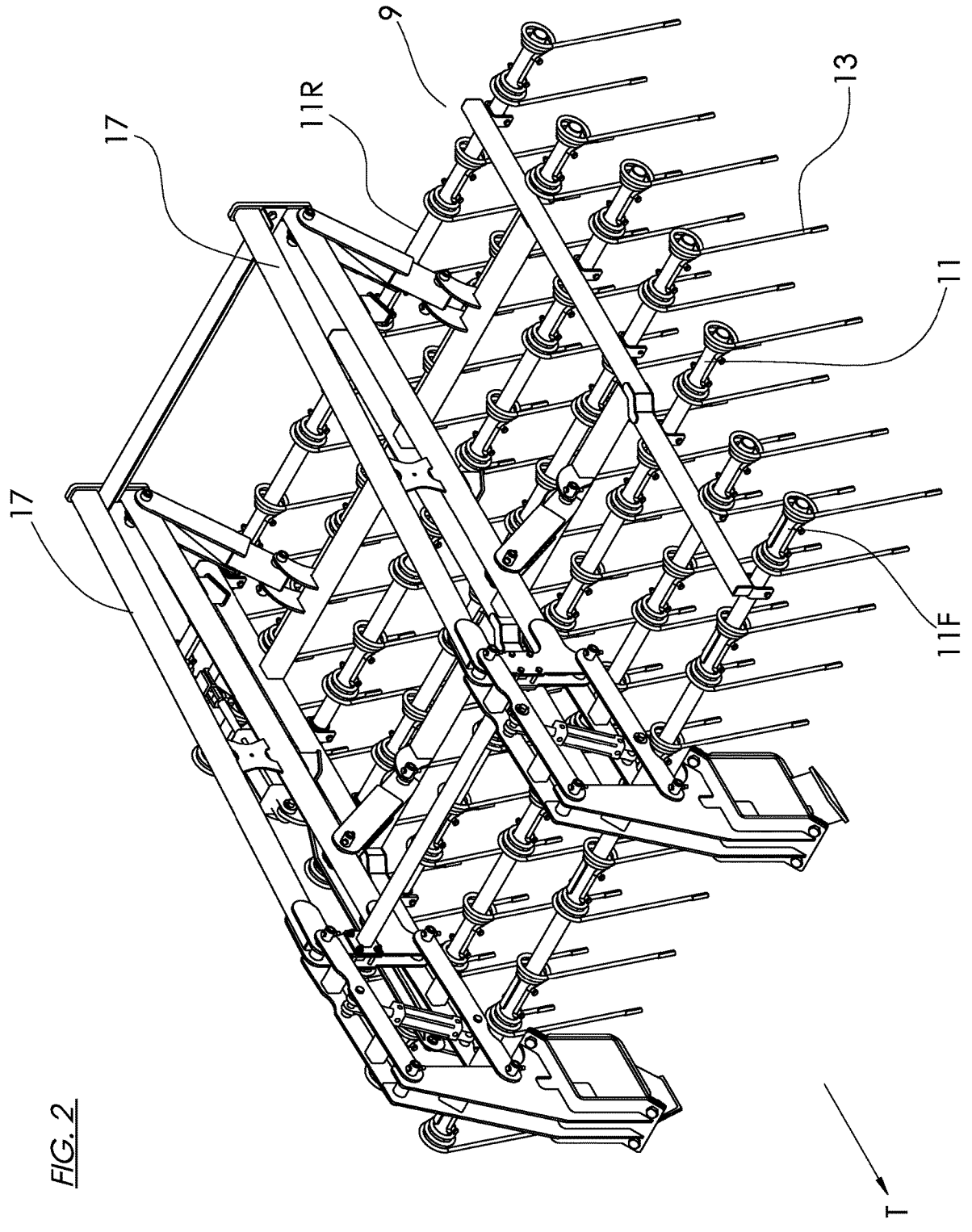
FIG. 2 is a perspective view of the harrow section and mounting assembly of the embodiment of FIG. 1.
Figure 6:
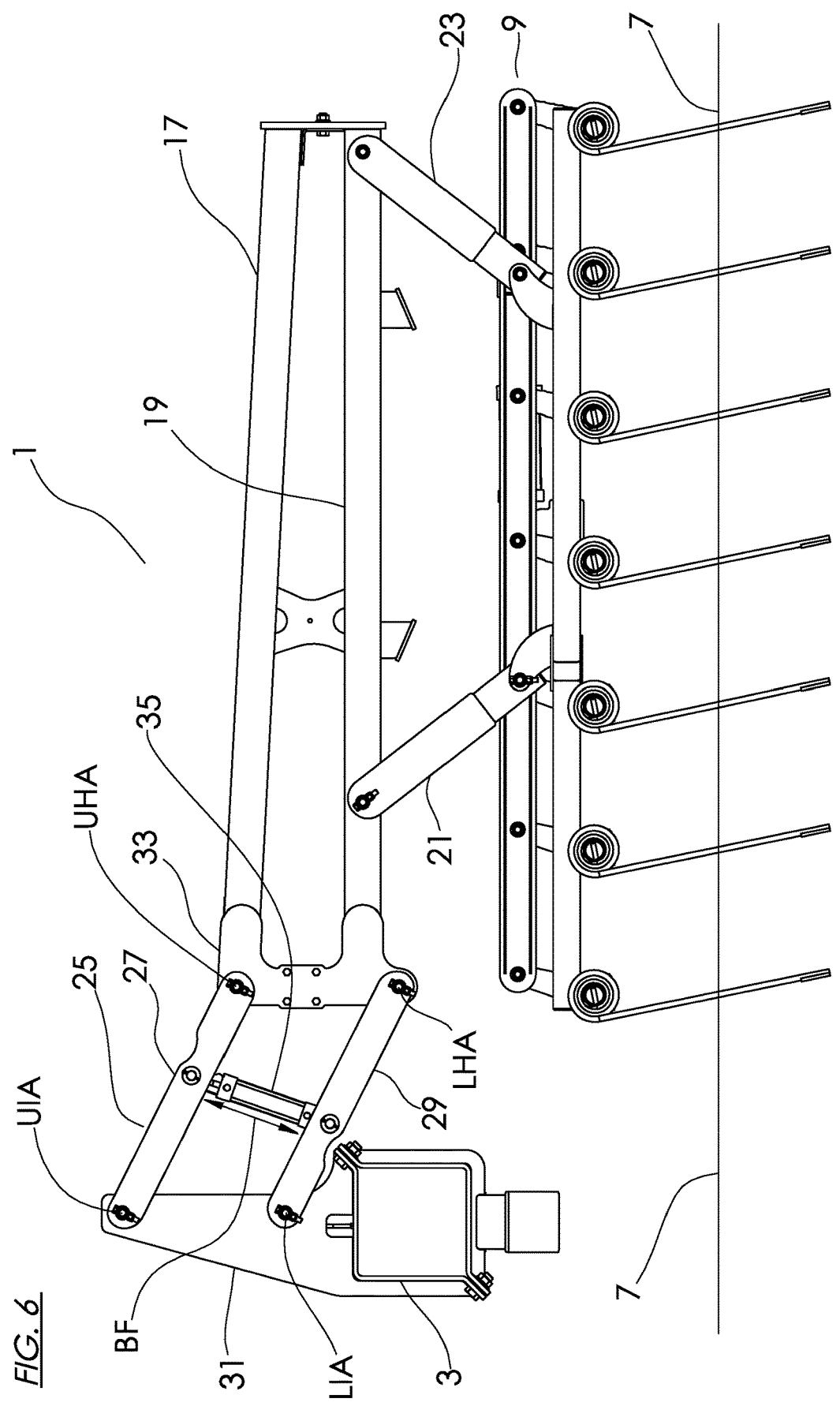
FIG. 6 is a side view of the embodiment of FIG. 1 when the harrow section is in the lowest position with respect to the implement frame.
Figure 7:
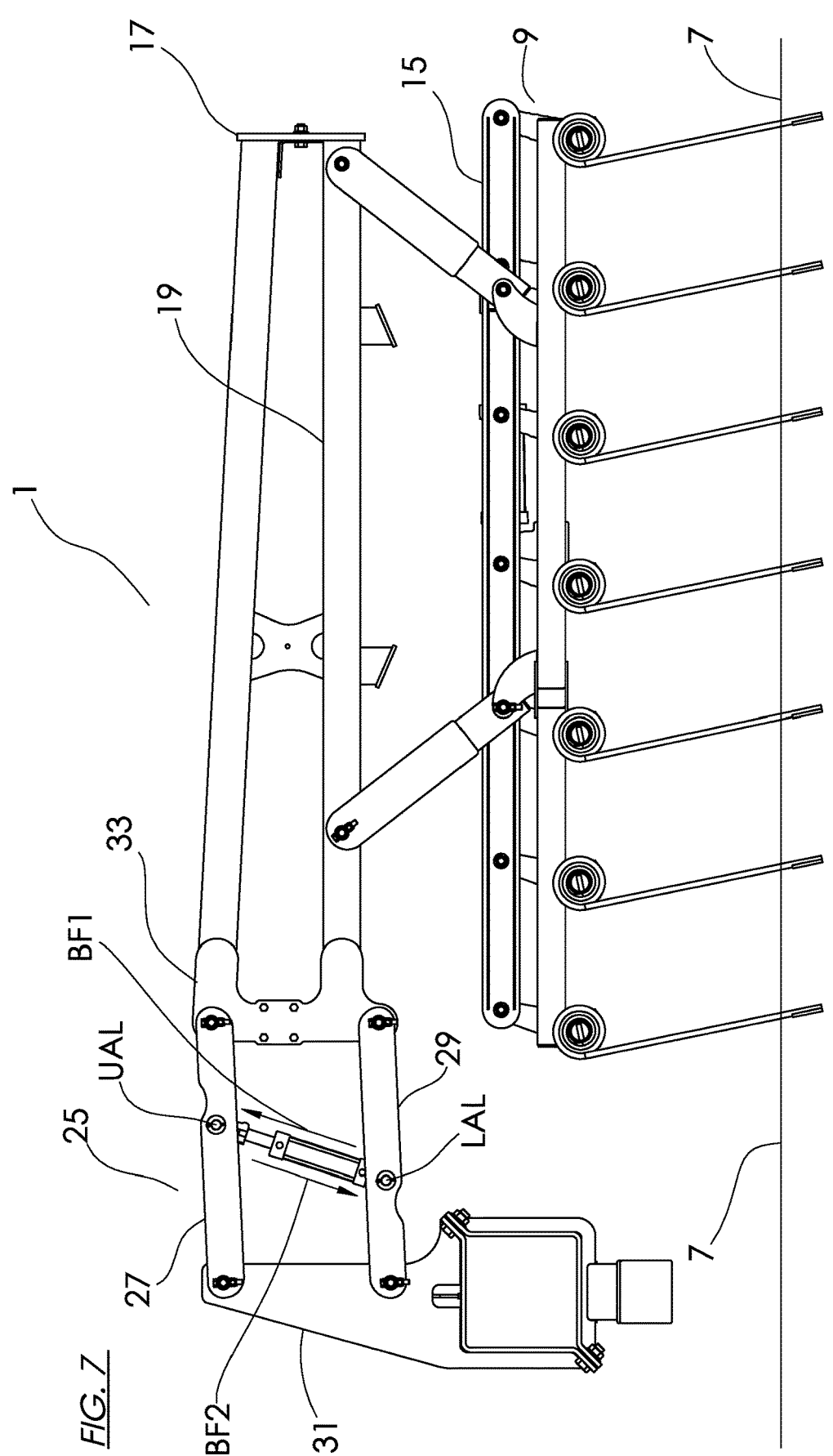
FIG. 7 is a side view of the embodiment of FIG. 1 when the harrow section is in an intermediate vertical position with respect to the implement frame.
Figure 8:
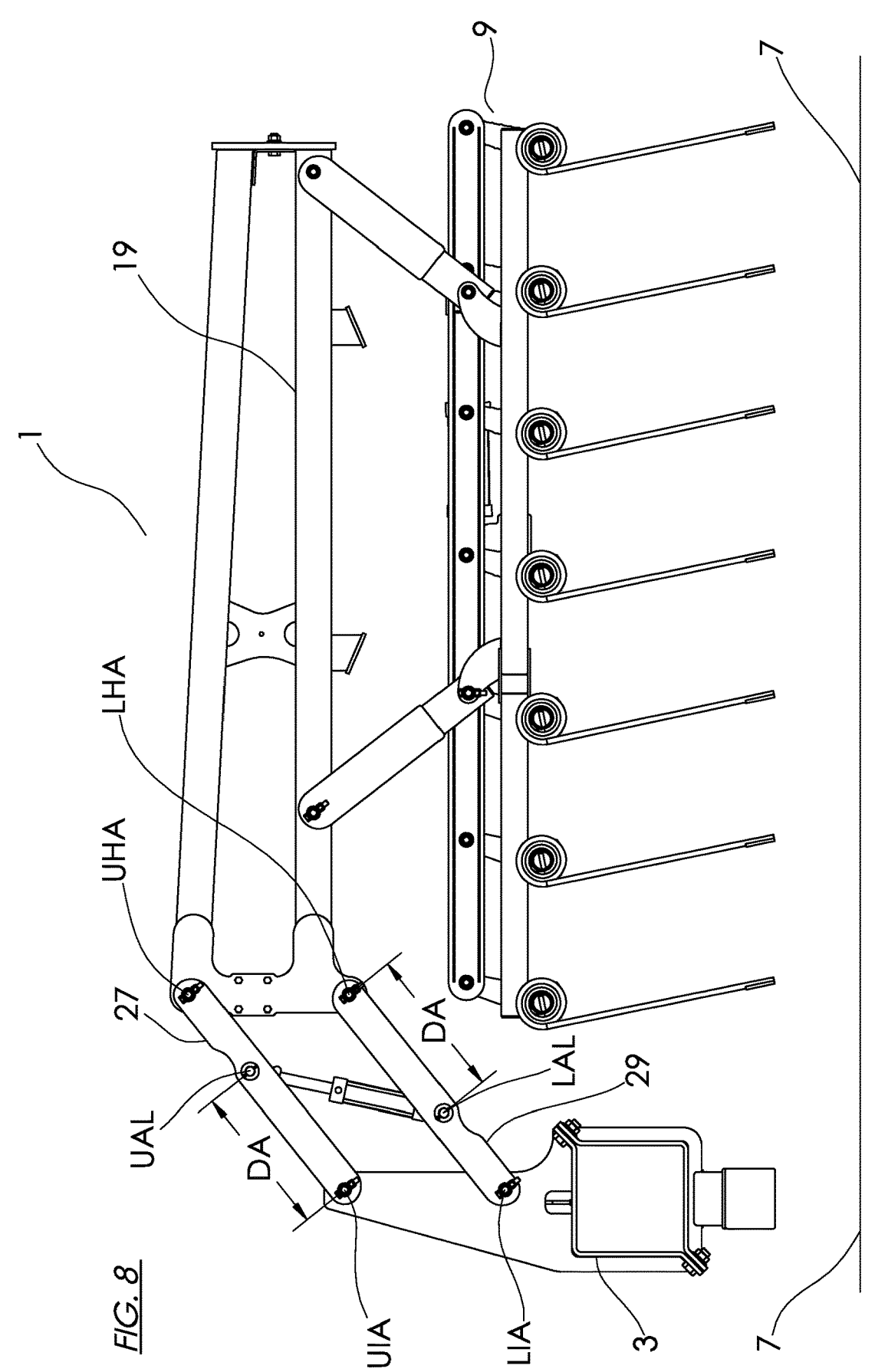
FIG. 8 is a side view of the embodiment of FIG. 1 when the harrow section is in the highest position with respect to the implement frame.

The tines 13 are attached to a harrow frame 15 and extend downward substantially an equal distance from the harrow frame 15. The harrow section 9 is attached to a mounting assembly 17 extending rearward from the implement frame 3 such that the harrow section 9 engages the ground surface 7 when in an operating position shown in FIG. 3. The mounting assembly 17 is selectively movable upward and downward with respect to the implement frame 3 to move the harrow section 9 down into the operating position as shown in FIG. 6 and up out of the operating position as shown in FIGS. 7 and 8. As seen in FIG. 2 each harrow section 9 is attached to the implement frame 3 by a pair of mounting assemblies 17.

The mounting assembly 17 comprises a beam 19 extending rearward above the harrow frame 15, and front and rear arms 21, 23 pivotally attached at upper ends thereof to corresponding front and rear beam pivot axes FBA, RBA located on the beam 19. The front arm 21 slopes downward and rearward to a lower end thereof that is pivotally attached to the harrow frame 15 at a front frame pivot axis FFA, and wherein the rear arm 23 slopes downward and forward to a lower end thereof that is pivotally attached to the harrow frame 15 at a rear frame pivot axis RFA located rearward of the front frame pivot axis FFA.

Figure 3:
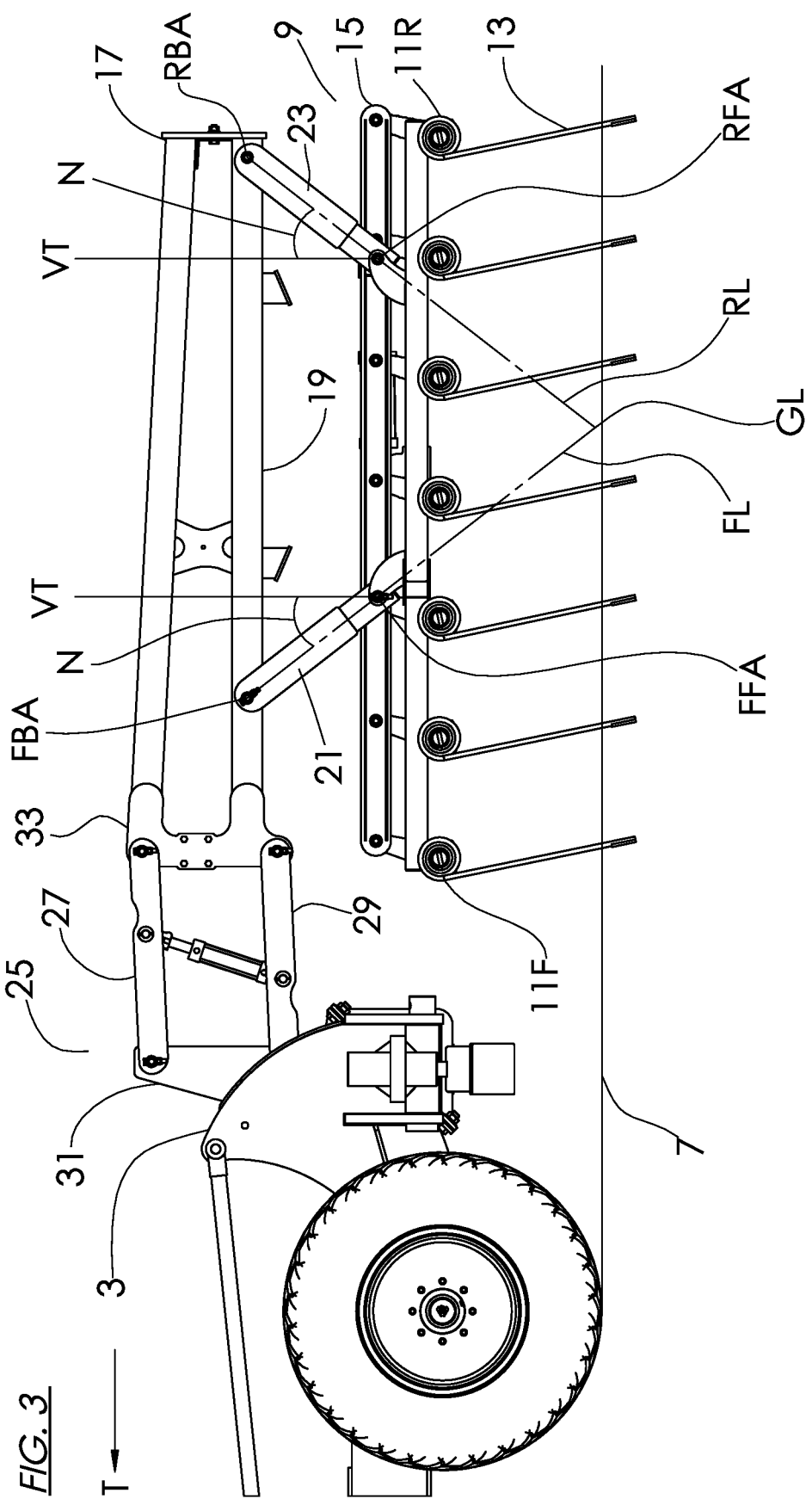
FIG. 3 is a side view of the embodiment of FIG. 1 when the implement frame and harrow section are located on a substantially horizontal ground surface.

In the illustrated apparatus 1 the front and rear arms 21, 23 are substantially equal in length. When the implement frame 3 and harrow section 9 are located on a substantially horizontal ground surface as shown in FIG. 3, the beam 19 is maintained in a position where an upper line joining the front and rear beam pivot axes FBA, RBA is in a substantially horizontal orientation as the mounting assembly 17 moves upward and downward with respect to the implement frame 3 as shown in FIGS. 6-8. As shown in FIG. 3 on level ground the mounting assembly 17 is configured such that when the front arm 21 slopes rearward and the rear arm 23 slopes forward at substantially the same angle N with respect to vertical VT, a lower line joining the front and rear frame pivot axes FFA, RFA is also substantially horizontal.

It can be seen in FIG. 3 that an obstruction, such as a ball of straw or the like, will contact the front row of tines 11F and exert an upward force on the front row of tine 11F, however this upward force on the front of the harrow section 9 also exerts a corresponding downward force on the rear row of tines 11R, which is resisted by the ground surface 7. The harrow section 9 thus moves along the ground surface 7 in a field with reduced up and down movement.

The forward and rearward sloping arms 21, 23 converge to form a virtual hinge point at a ground location GL about which the harrow section 9 can pivot fore and aft to follow the ground surface 7. A front line FL joining the front beam pivot axis FBA and the front frame pivot axis FFA extends to the a ground location GL on the ground surface when the harrow section 9 is in the operating position engaged in the ground surface as shown in FIG. 3, and a rear line RL joining the rear beam pivot axis RBA and the rear frame pivot axis RFA extends to the same ground location GL when the harrow section 9 is in the operating position. The ground location GL is in a middle portion of the harrow section 9 between the front row of tines 11F and the rear row of tines 11R.

Figure 4:
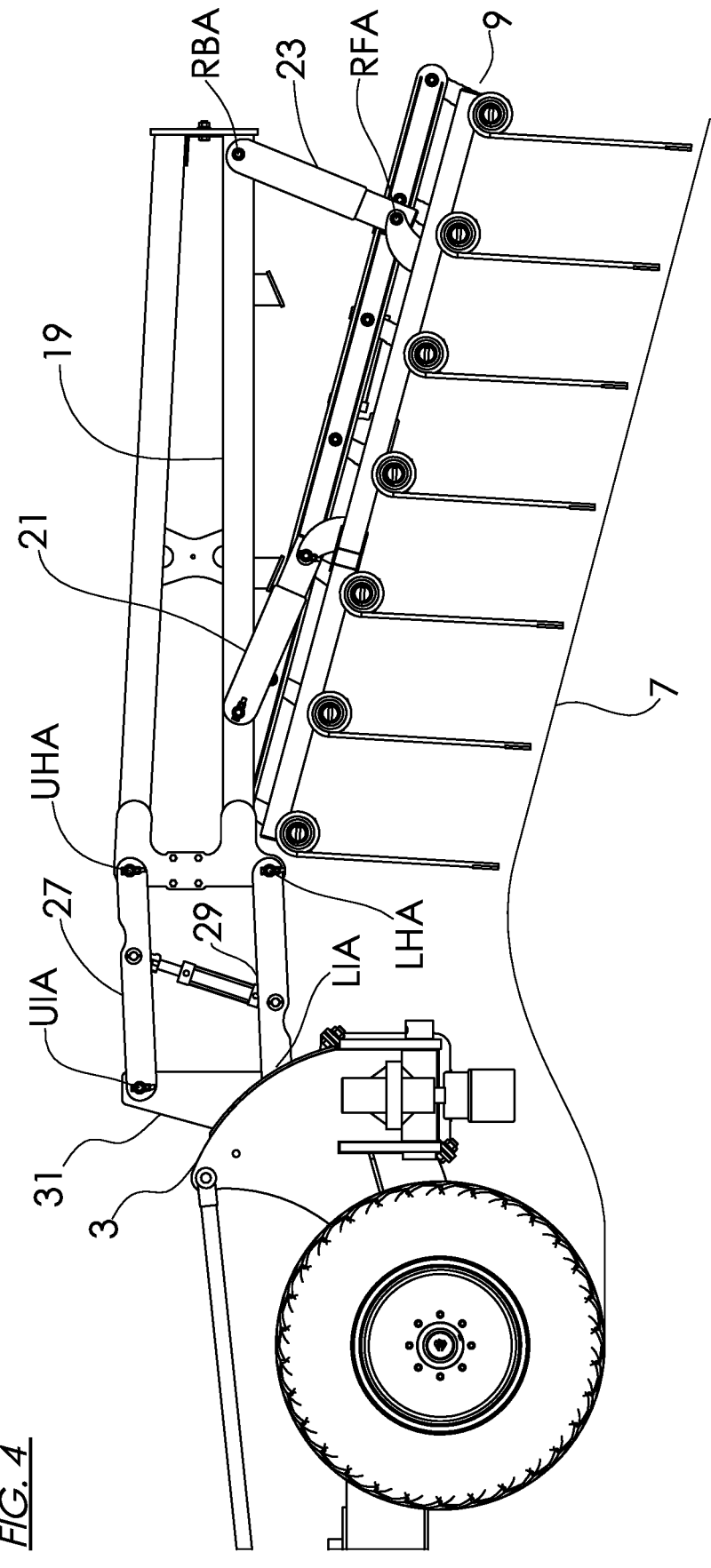
FIG. 4 is a side view of the embodiment of FIG. 1 when the implement frame and harrow section are located on an undulating ground surface where the harrow section is tilted upward at the front.
Figure 5:
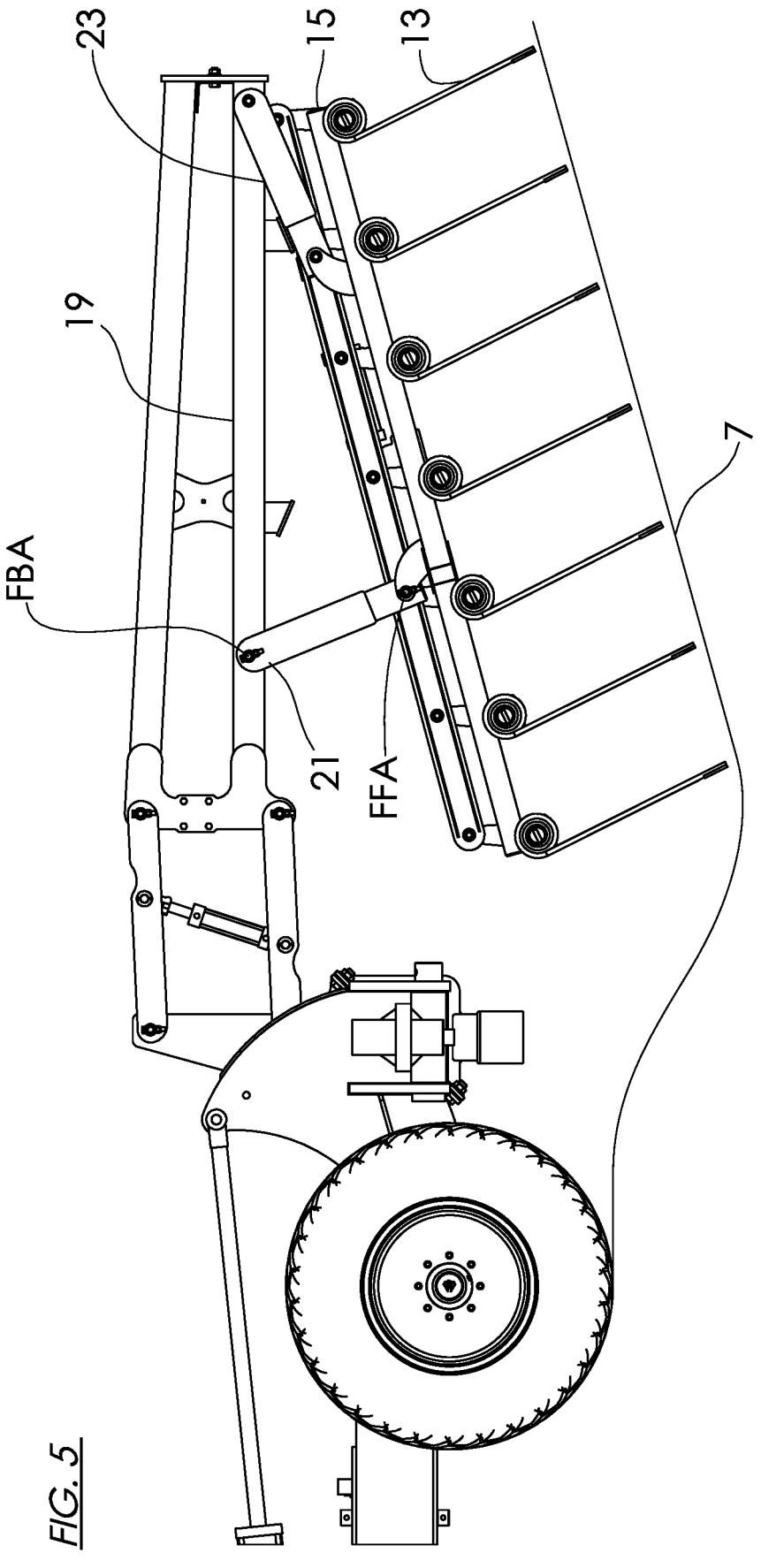
FIG. 5 is a side view of the embodiment of FIG. 1 when the implement frame and harrow section are located on an undulating ground surface where the harrow section is tilted downward at the front.

As seen in FIGS. 4 and 5 when the implement frame 3 and harrow section 9 are on an undulating ground surface 7 the harrow section 9 can pivot generally about the ground location GL to follow the contours of the ground surface GL in the field.

The illustrated mounting assembly 17 comprises a parallel linkage 25 comprising upper and lower links 27, 29 pivotally attached to implement bracket 31 that fixed to the implement frame 3 at front ends thereof about corresponding upper and lower implement pivot axes UIA, LIA and pivotally attached to the a harrow bracket 33 fixed to the beam 19 at rear ends thereof about corresponding upper and lower harrow pivot axes UHA, LHA. The mounting assembly 17 comprises an extendable actuator 35 pivotally attached to the parallel linkage 25 rearward of the implement frame 3 and is operative in first and second modes to move the mounting assembly 17 upward and downward.

An extendable actuator 35 is pivotally attached to the upper link 27 at an upper actuator location UAL, and pivotally attached to the lower link 29 at a lower actuator location LAL that is offset from the upper actuator location toward the front or to the rear of the parallel linkage 25. In the apparatus of FIGS. 1-8, the lower actuator location LAL is offset from the upper actuator location UAL toward the front of the parallel linkage 25, such that extending the extendable actuator 35 raises the harrow section 9, and retracting the extendable actuator 35 lowers the harrow section 9.

Figure 9:
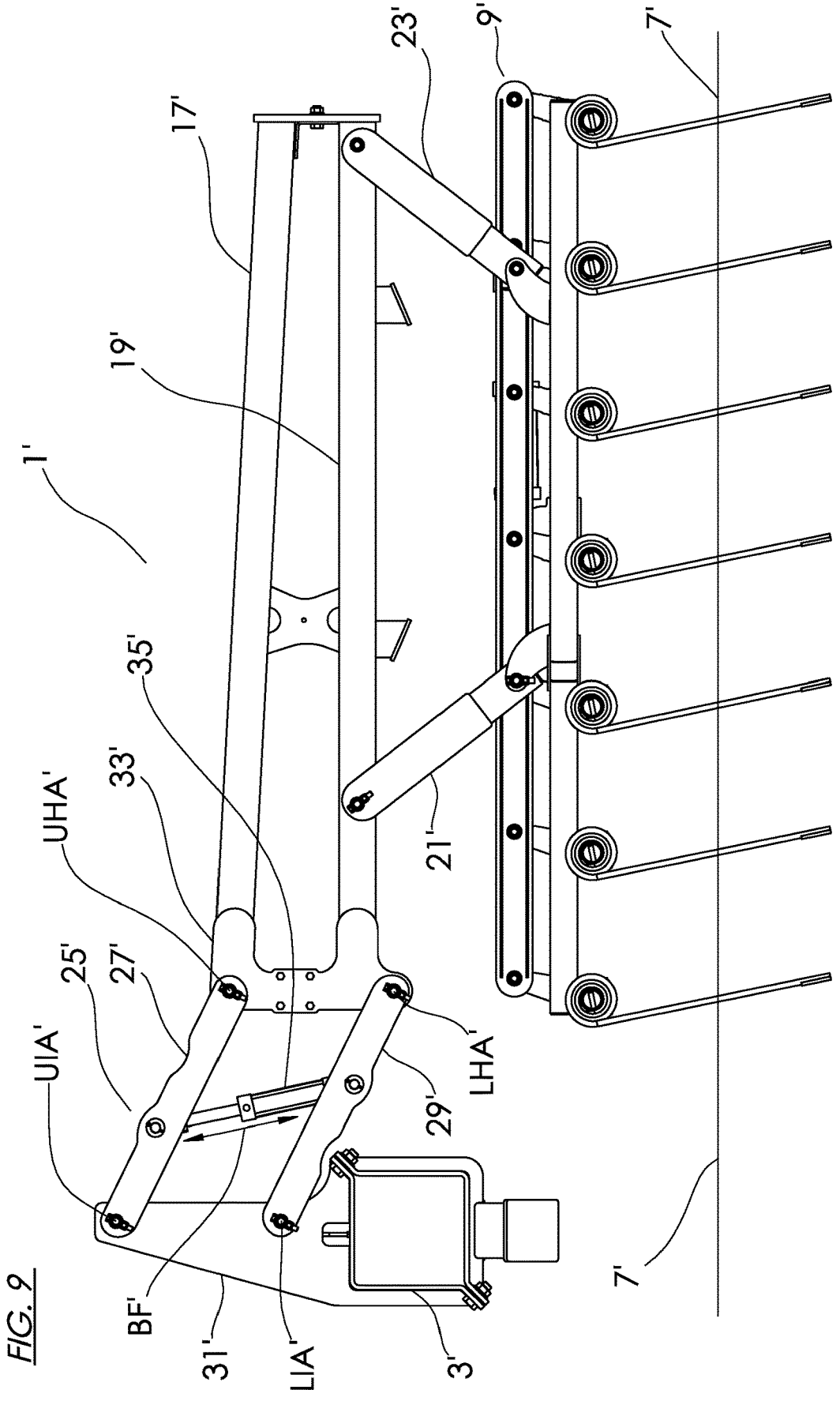
FIG. 9 is a side view of an alternate embodiment where the lower actuator location is offset toward a rear of the parallel linkage, the embodiment shown when the harrow section is in the lowest position with respect to the implement frame.
Figure 10:
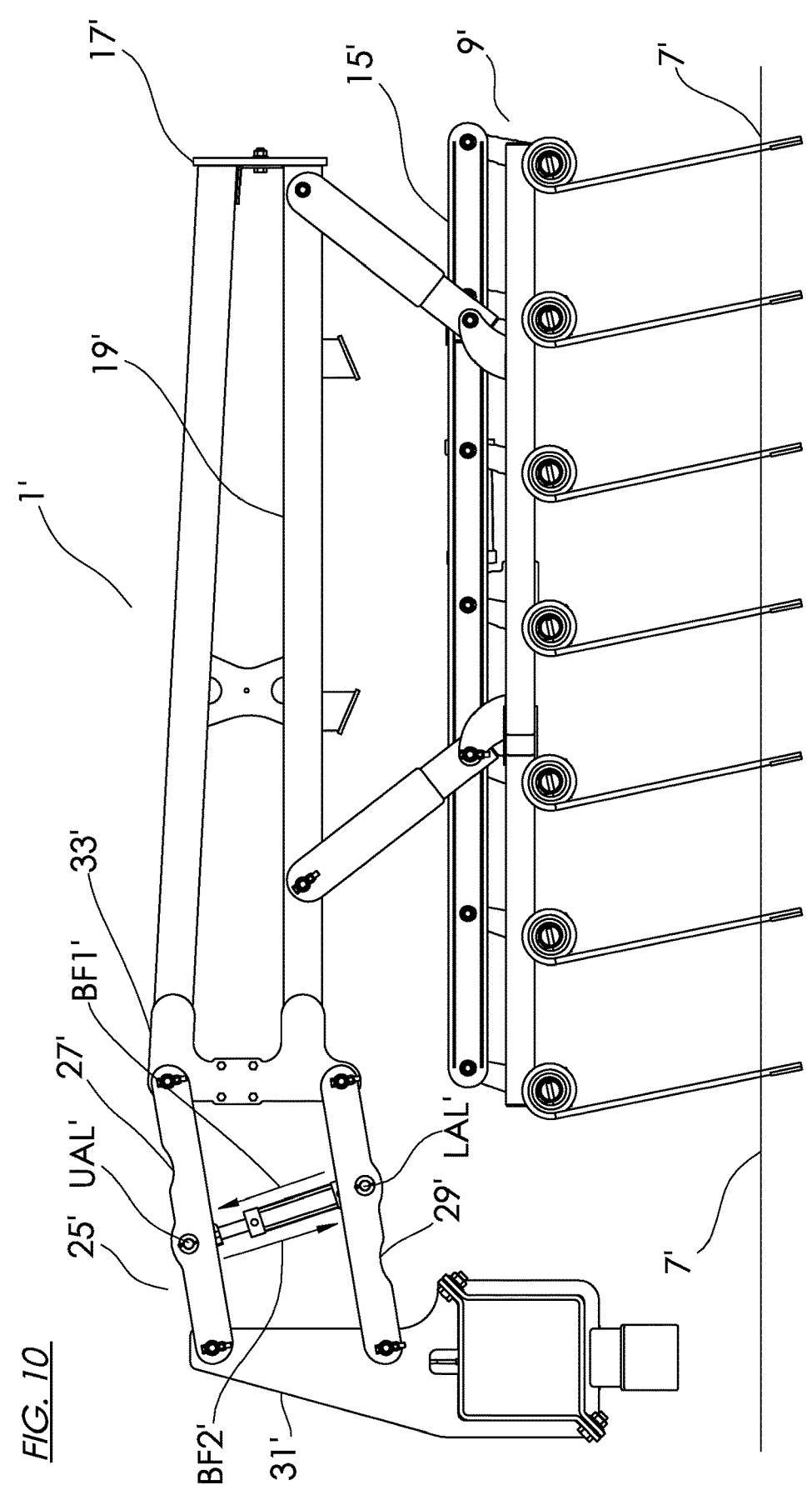
FIG. 10 is a side view of the embodiment of FIG. 9 when the harrow section is in an intermediate vertical position with respect to the implement frame.

In contrast in the apparatus 1' shown in FIGS. 9-11, the lower actuator location LAL is offset from the upper actuator location UAL toward the rear of the parallel linkage 25', such that extending the extendable actuator 35' lowers the harrow section 9', and retracting the extendable actuator 35 raises the harrow section 9'.

In the illustrated apparatus 1, 1' the upper actuator location UAL is a distance DA, DA' from the upper implement pivot axis that is equal to the distance from the lower actuator location to the lower harrow axis. During manufacture this arrangement simply allows the upper and lower links 27, 29, 27' 29' to be provided by the same part. In practice the upper and lower actuator locations UAL, LAL must simply be offset to the front or the rear with respect to each other for the arrangement to operate successfully While the extendable actuator 35, 35' could be provided by an electric actuator, or air activated actuator, or the like, as will typically be the case in the illustrated apparatus 1, 1', 1" the extendable actuator 35, 35', is provided by a hydraulic cylinder that is operative to exert a selectable bias force BF on the upper and lower links 27, 29.

In FIGS. 1-8, the bias force BF is operative in an upward mode BF1 to force the upper actuator location UAL away from the lower actuator location LAL and is operative in a downward mode BF2 to force the upper actuator location UAL toward the lower actuator location LAL. In FIGS. 9-11, the bias force BF is operative in an upward mode BF1 to force the upper actuator location UAL toward the lower actuator location LAL and is operative in a downward mode BF2 to force the upper actuator location UAL away from the lower actuator location LAL.

Figure 12:
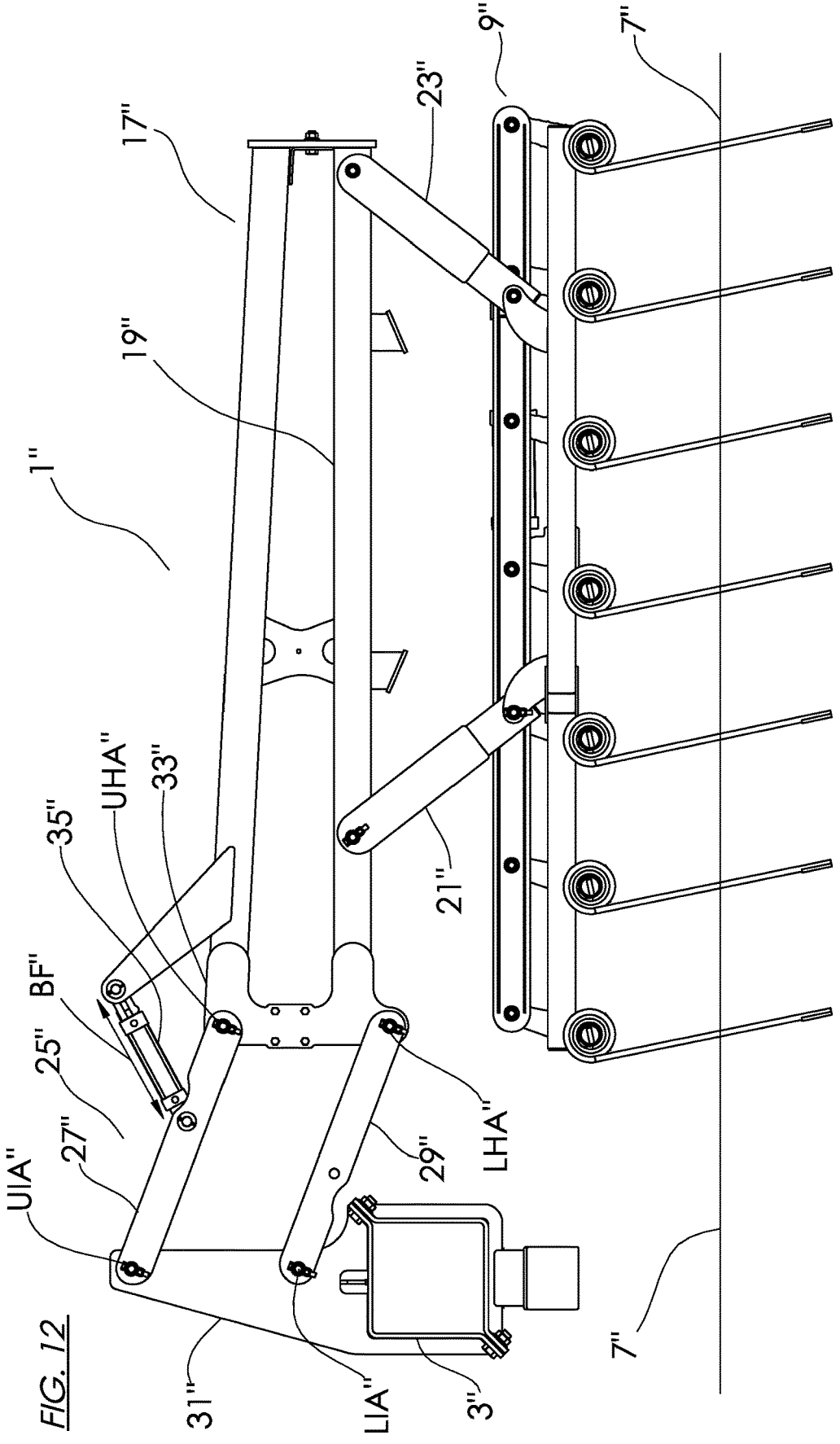
FIG. 12 is a side view of a further alternate embodiment where the extendable actuator is attached to the beam, the embodiment shown when the harrow section is in the highest position with respect to the implement frame.
Figure 13:
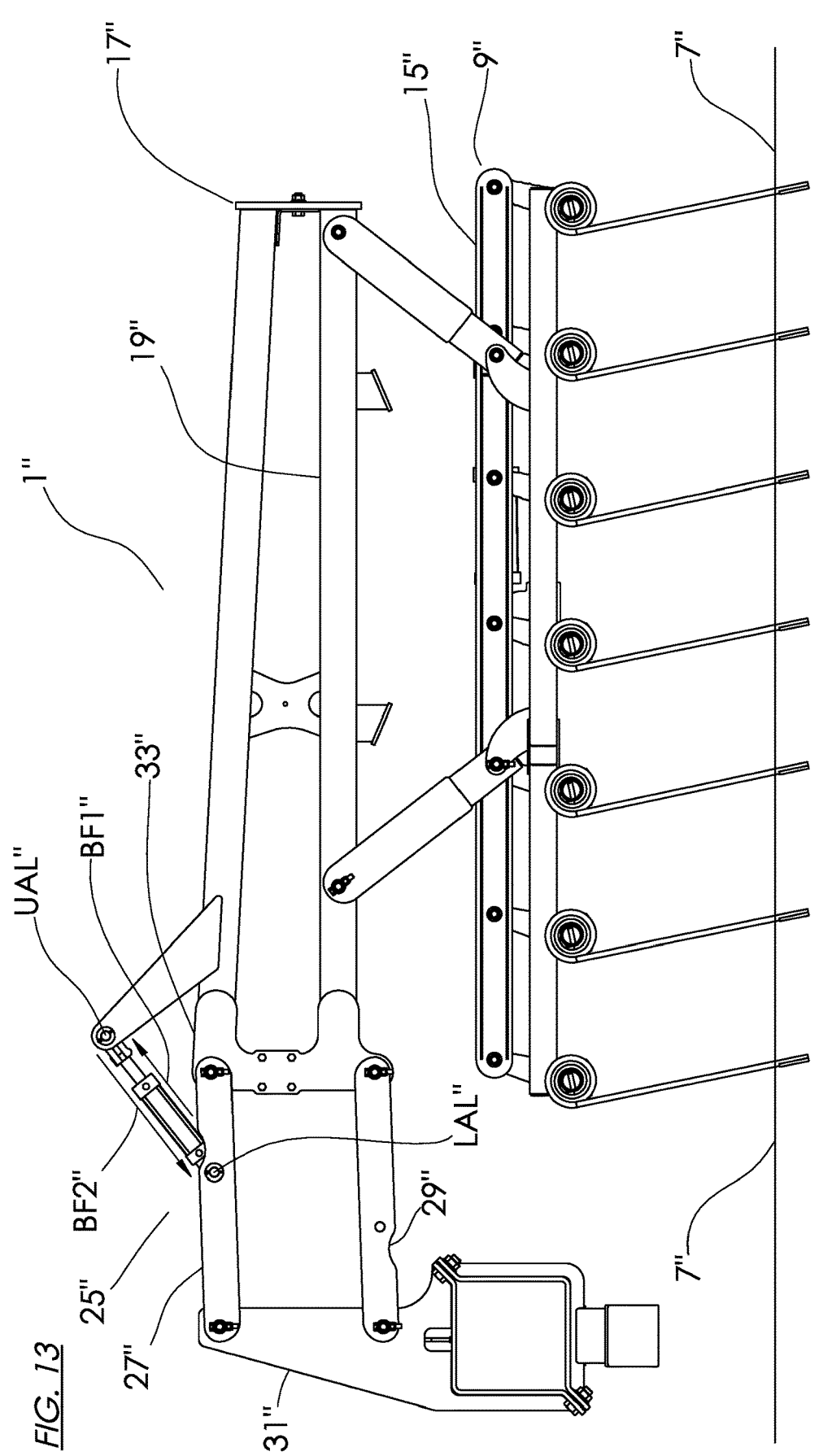
FIG. 13 is a side view of the embodiment of FIG. 12 when the harrow section is in an intermediate vertical position with respect to the implement frame.
Figure 14:
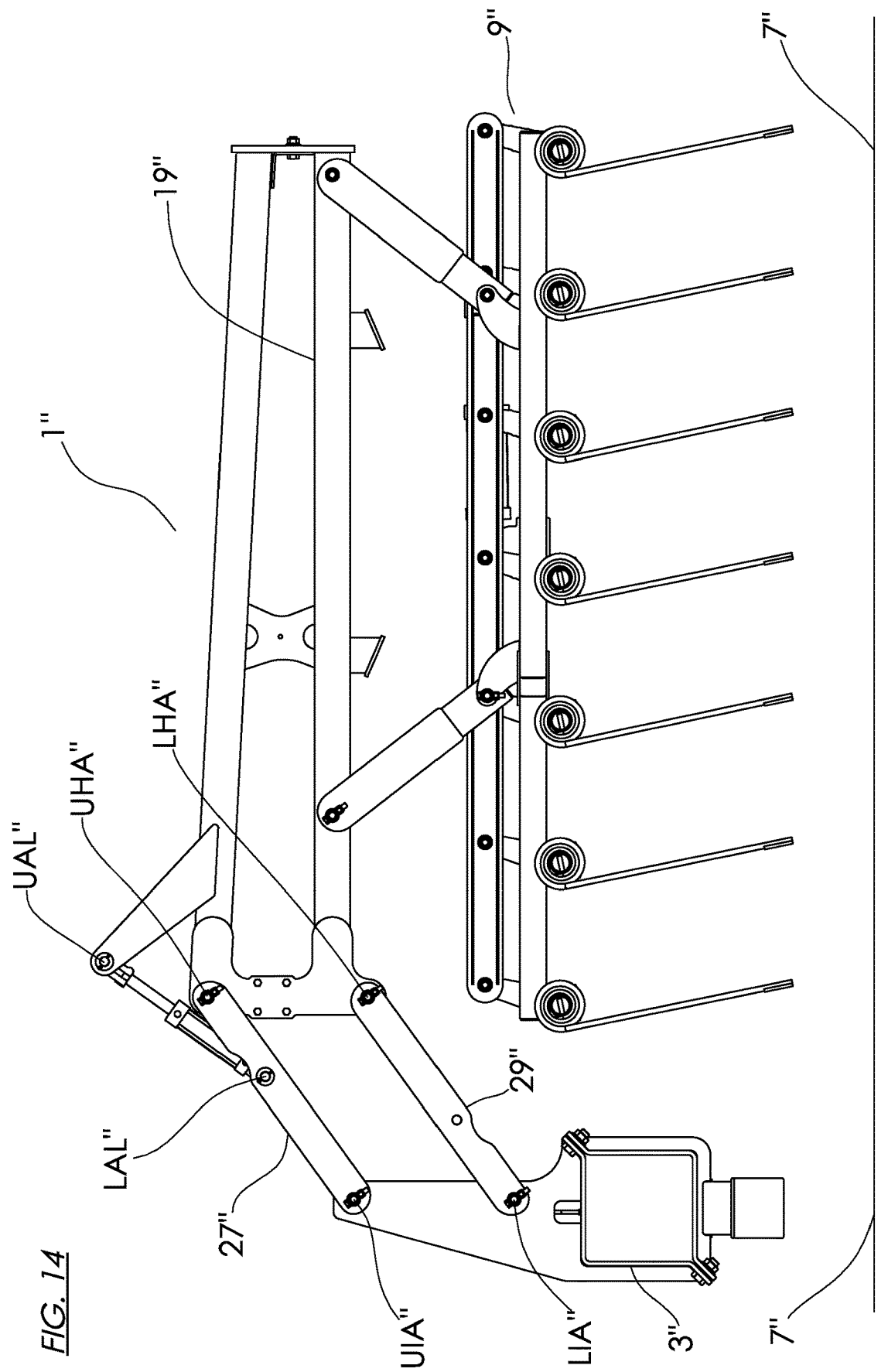
FIG. 14 is a side view of the embodiment of FIG. 12 when the harrow section is in the highest position with respect to the implement frame.

FIGS. 12-14 show a further alternate apparatus 1" wherein the mounting assembly 19" comprises an extendable actuator 35" pivotally attached to one of the upper link 27" and the lower link 29" at a front actuator location FAL, and pivotally attached to the beam 11" at a rear actuator location RAL. Extending and retracting the extendable actuator 35" raises and lowers the harrow section 9". The bias force BF can be varied as is known in the art to vary the downward force on the harrow section 9, 9", 9" to exert no force on the harrow section 9, 9", 9" so the harrow section 9, 9", 9" floats, or to vary an upward force on the harrow section which can be used to raise the harrow section out of the operating position, or to simply reduce the weight of the harrow section 9, 9", 9" as it works the ground surface where only a light harrowing operation is desired.

The present disclosure further provides a method of mounting a harrow section 9 to an implement frame 3 operative to move along a ground surface 7 in an operating travel direction T. The method comprises providing a harrow section 9 comprising a plurality of rows of tines 13, the rows of tines spaced rearward from a front row of tines 11F to a rear row of tines 11R, and oriented substantially perpendicular to the operating travel direction T; wherein the tines 13 are attached to a harrow frame 15 and extend downward substantially an equal distance from the harrow frame 15; attaching a beam 19 extending rearward from the implement frame 3 and operative to move upward and downward with respect to the implement frame; attaching the harrow section 9 under the beam 19b pivotally attaching front and rear arms 21, 23 at upper ends thereof to corresponding front and rear beam pivot axes FBA, RBA located on the beam 19, and attaching the front and rear arms at lower ends thereof to corresponding front and rear frame pivot axes FFA, RFA located on the harrow frame 15; configuring the front and rear arms 21, 23 such that the front arm 21 slopes downward and rearward to the lower end thereof and the rear arm 23 slopes downward and forward to the lower end thereof.

The present disclosure provides a harrow section 9 with improved ground following capabilities and where the force of the harrow section 9 with respect to the ground surface 7 can be varied.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A harrow apparatus comprising:

an implement frame mounted on wheels for travel along a ground surface in an operating travel direction;

a harrow section comprising a plurality of rows of tines, the rows of tines spaced rearward from a front row of tines to a rear row of tines, and oriented substantially perpendicular to the operating travel direction;

wherein the tines are attached to a harrow frame and extend downward substantially an equal distance from the harrow frame;

wherein the harrow section is attached to a mounting assembly extending rearward from the implement frame such that the harrow section engages the ground surface when in an operating position;

wherein the mounting assembly is selectively movable upward and downward with respect to the implement frame to move the harrow section down into the operating position and up out of the operating position;

wherein the mounting assembly comprises a beam extending rearward above the harrow frame;

wherein the mounting assembly comprises front and rear arms pivotally attached at upper ends thereof to corresponding front and rear beam pivot axes located on the beam;

wherein the front arm slopes downward and rearward to a lower end thereof that is pivotally attached to the harrow frame at a front frame pivot axis;

wherein the rear arm slopes downward and forward to a lower end thereof that is pivotally attached to the harrow frame at a rear frame pivot axis located rearward of the front frame pivot axis;

wherein the front and rear arms are substantially equal in length;

wherein when the implement frame and harrow section are located on a substantially horizontal ground surface the beam is maintained in a position where an upper line joining the front and rear beam pivot axes is in a substantially horizontal orientation as the mounting assembly moves upward and downward with respect to the implement frame;

wherein the mounting assembly is configured such that when the front arm slopes rearward and the rear arm slopes forward at substantially the same angle with respect to a vertical line, a lower line joining the front and rear frame pivot axes is also substantially horizontal; and wherein a front line joining the front beam pivot axis and the front frame pivot axis extends to a ground location on the ground surface when the harrow section is in the operating position engaged in the ground surface, and a rear line joining the rear beam pivot axis and the rear frame pivot axis extends to the same ground location when the harrow section is in the operating position, and wherein the ground location is in a middle portion of the harrow section between the front row of tines and the rear row of tines.

2. The apparatus of claim 1 wherein the mounting assembly comprises a parallel linkage comprising:

upper and lower links pivotally attached to the implement frame at front ends thereof about corresponding upper and lower implement pivot axes, and pivotally attached to the beam at rear ends thereof about corresponding upper and lower harrow pivot axes;

an extendable actuator pivotally attached to the upper link at an upper actuator location, and pivotally attached to the lower link at a lower actuator location that is offset from the upper actuator location toward the front or to the rear of the parallel linkage.

3. The apparatus of claim 2 wherein the upper actuator location is a distance from the upper implement pivot axis that is equal to the distance from the lower actuator location to the lower harrow axis.

4. The apparatus of claim 1 wherein the mounting assembly comprises a parallel linkage comprising:

upper and lower links pivotally attached to the implement frame at front ends thereof about corresponding upper and lower implement pivot axes, and pivotally attached to the beam at rear ends thereof about corresponding upper and lower harrow pivot axes;

an extendable actuator pivotally attached to one of the upper link and the lower link at a front actuator location, and pivotally attached to the beam at a rear actuator location.

5. The apparatus of claim 2 wherein the extendable actuator is provided by a hydraulic cylinder operative to exert a selectable bias force on the upper and lower links.

6. The apparatus of claim 3 wherein the bias force is operative in a first mode to force the upper actuator location away from the lower actuator location and is operative in a second mode to force the upper actuator location toward the lower actuator location.

7. The apparatus of claim 2 wherein the extendable actuator is provided by an electric actuator.

8. A harrow apparatus comprising:

an implement frame mounted on wheel for travel along a ground surface in an operating travel direction;

a harrow section comprising a plurality of rows of tines, the rows of tines spaced rearward from a front row of tines to a rear row of tines, and oriented substantially perpendicular to the operating travel direction;

wherein the tines are attached to a harrow frame and extend downward substantially an equal distance from the harrow frame;

wherein the harrow section is attached to a mounting assembly by a beam extending rearward from the implement frame such that the harrow section engages the ground surface when in an operating position;

wherein the mounting assembly comprises a parallel linkage comprising:

an upper link; and a lower link;

wherein the upper link and the lower link are pivotally attached to the implement frame at front ends thereof about corresponding upper and lower implement pivot axes, and pivotally attached to the beam at rear ends thereof about corresponding upper and lower harrow pivot axes;

wherein the mounting assembly comprises an extendable actuator pivotally attached directly to the upper link at an upper actuator location, and pivotally attached directly to the lower link at a lower actuator location location that is offset from the upper location toward the front or to the rear of the parallel linkage; and wherein the extendable actuator is operative to move the mounting assembly upward and downward.

9. The apparatus of claim 8 wherein the upper location is a distance from the upper implement pivot axis that is equal to the distance from the lower location to the lower harrow axis.

10. The apparatus of claim 8 wherein the extendable actuator is provided by a hydraulic cylinder operative to exert a selectable bias force on the parallel linkage.

11. The apparatus of claim 8 wherein the bias force is operative in a first mode to force the upper actuator location away from the lower actuator location and is operative in a second mode to force the upper actuator location toward the lower actuator location.

12. The apparatus of claim 8 wherein the beam extends rearward from the implement frame and front and rear arms are pivotally attached at upper ends thereof to corresponding front and rear beam pivot axes located on the beam, and wherein the front arm slopes downward and rearward to a lower end thereof that is pivotally attached to the harrow frame at a front frame pivot axis, and wherein the rear arm slopes downward and forward to a lower end thereof that is pivotally attached to the harrow frame at a rear frame pivot axis located rearward of the front frame pivot axis.

13. The apparatus of claim 12 wherein when the implement frame and harrow section are located on a substantially horizontal ground surface the beam is maintained in a position where an upper line joining the front and rear beam pivot axes is in a substantially horizontal orientation as the mounting assembly moves upward and downward with respect to the implement frame.

14. The apparatus of claim 13 wherein the mounting assembly is configured such that when the front arm slopes rearward and the rear arm slopes forward at substantially the same angle with respect to a vertical line, a lower line joining the front and rear frame pivot axes is also substantially horizontal.

15. The apparatus of claim 14 wherein a front line joining the front beam pivot axis and the front frame pivot axis extends to the a ground location on the ground surface when the harrow section is in the operating position engaged in the ground surface, and a rear line joining the rear beam pivot axis and the rear frame pivot axis extends to the same ground location when the harrow section is in the operating position, and wherein the ground location is in a middle portion of the harrow section between the front row of tines and the rear row of tines.

16. The apparatus of claim 12 wherein the front and rear arms are substantially equal in length.

17. A method of mounting a harrow section to an implement frame operative to move along a ground surface in an operating travel direction, the method comprising:

providing a harrow section comprising a plurality of rows of tines, the rows of tines spaced rearward from a front row of tines to a rear row of tines, and oriented substantially perpendicular to the operating travel direction;

wherein the tines are attached to a harrow frame and extend downward substantially an equal distance from the harrow frame;

attaching a beam extending rearward from the implement frame and operative to move upward and downward with respect to the implement frame;

attaching the harrow section under the beam by pivotally attaching front and rear arms at upper ends thereof to corresponding front and rear beam pivot axes located on the beam, and attaching the front and rear arms at lower ends thereof to corresponding front and rear frame pivot axes located on the harrow frame;

configuring the front and rear arms such that the front arm slopes downward and rearward to the lower end thereof and the rear arm slopes downward and forward to the lower end thereof;

wherein the front and rear arms are substantially equal in length;

wherein, when the implement frame and harrow section are located on a substantially horizontal ground surface, maintaining the beam to be in a position where an upper line joining the front and rear beam pivot axes is in a substantially horizontal orientation as the beam moves upward and downward;

wherein when the implement frame and harrow section are located on a substantially horizontal ground surface, configuring the front arm to slope rearward and the rear arm to slope forward at substantially the same angle with respect to a vertical line, such that a lower line joining the front and rear frame pivot axes is also substantially horizontal; and wherein a front line joining the front beam pivot axis and the front frame pivot axis extends to a ground location on the ground surface when the harrow section is in an operating position engaged in the ground surface, and a rear line joining the rear beam pivot axis and the rear frame pivot axis extends to the same ground location when the harrow section is in the operating position, and wherein the ground location is in a middle portion of the harrow section between the front row of tines and the rear row of tines.

18. A harrow apparatus comprising:

an implement frame mounted on wheel for travel along a ground surface in an operating travel direction;

a harrow section comprising a plurality of rows of tines, the rows of tines spaced rearward from a front row of tines to a rear row of tines, and oriented substantially perpendicular to the operating travel direction;

wherein the tines are attached to a harrow frame and extend downward substantially an equal distance from the harrow frame;

wherein the harrow section is attached to a mounting assembly by a beam extending rearward from the implement frame such that the harrow section engages the ground surface when in an operating position;

wherein the mounting assembly comprises a parallel linkage comprising:

an upper link; and a lower link;

wherein the upper link and the lower link are pivotally attached to the implement frame at front ends thereof about corresponding upper and lower implement pivot axes, and pivotally attached to the beam at rear ends thereof about corresponding upper and lower harrow pivot axes; and wherein the mounting assembly comprises an extendable actuator pivotally attached directly to one of the upper link and the lower link at a front actuator location, and pivotally attached directly to the beam at a rear actuator location and operative to move the mounting assembly upward and downward.

19. The apparatus of claim 18 wherein the extendable actuator is provided by a hydraulic cylinder operative to exert a selectable bias force on the parallel linkage.

* * * * *